United States Patent [19]

Urbom

[11] Patent Number: 4,984,725

[45] Date of Patent: Jan. 15, 1991

[54] VEHICULAR HOLSTER MOUNT APPARATUS

[76] Inventor: Deron L. Urbom, 207½ 4th Ave., Holdrege, Nebr. 68949

[21] Appl. No.: 493,848

[22] Filed: Mar. 15, 1990

[51] Int. Cl.⁵ .............................................. B60R 7/04
[52] U.S. Cl. .................................... 224/311; 224/273; 224/912; 248/205.2; 248/684
[58] Field of Search ............... 224/311, 312, 273, 901, 224/42.45 R, 911-913; 211/64; 296/37.7; 248/205.2, 205.1, 684

[56] References Cited

U.S. PATENT DOCUMENTS

| | | | |
|---|---|---|---|
| 1,964,035 | 6/1934 | Cross | 224/273 |
| 1,969,258 | 8/1934 | Cross | 224/273 |
| 2,829,813 | 4/1958 | Sebell | 224/311 |
| 3,261,521 | 7/1966 | Meccico et al. | 211/64 X |
| 3,357,065 | 12/1967 | Anketell | 224/42.45 R |
| 3,802,612 | 4/1974 | Smith | 224/913 X |
| 3,917,207 | 11/1975 | Quigley | 224/42.45 R X |
| 4,120,436 | 10/1978 | Burch | 224/311 |
| 4,256,245 | 3/1981 | Serres | 224/273 |
| 4,461,442 | 7/1984 | Keenan | 248/205.1 |
| 4,483,501 | 11/1984 | Eddy | 248/205.1 |

Primary Examiner—Henry J. Recla
Assistant Examiner—Casey Jacyna
Attorney, Agent, or Firm—Leon Gilden

[57] ABSTRACT

An apparatus including an elongate, rigid spine member mounting a plate member orthogonally relative to an upper end of the spine, with a flexible belt including a fastener member mounted adjacent a lower end of the spine, wherein the spine is mounted to a roof portion of a vehicle. The apparatus further includes pin members projecting orthogonally and longitudinally of the spine to be directed within the headliner of a vehicular roof to mount the spine thereto. A holster belt loop is directed about the plate, with the flexible strap securing the holster relative to the spine to position the holster in a secured orientation relative to the interior portion of the vehicular roof.

7 Claims, 4 Drawing Sheets

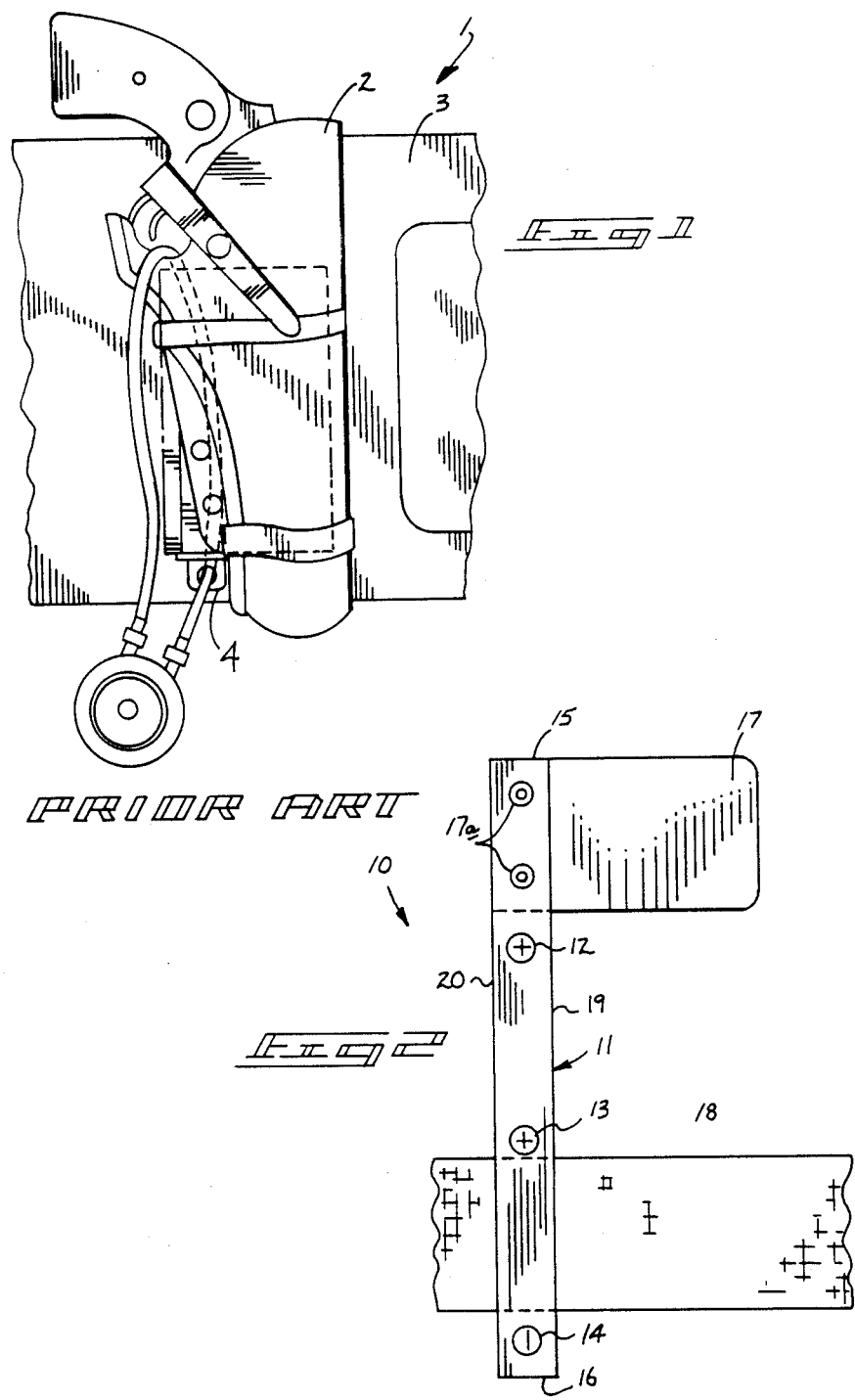

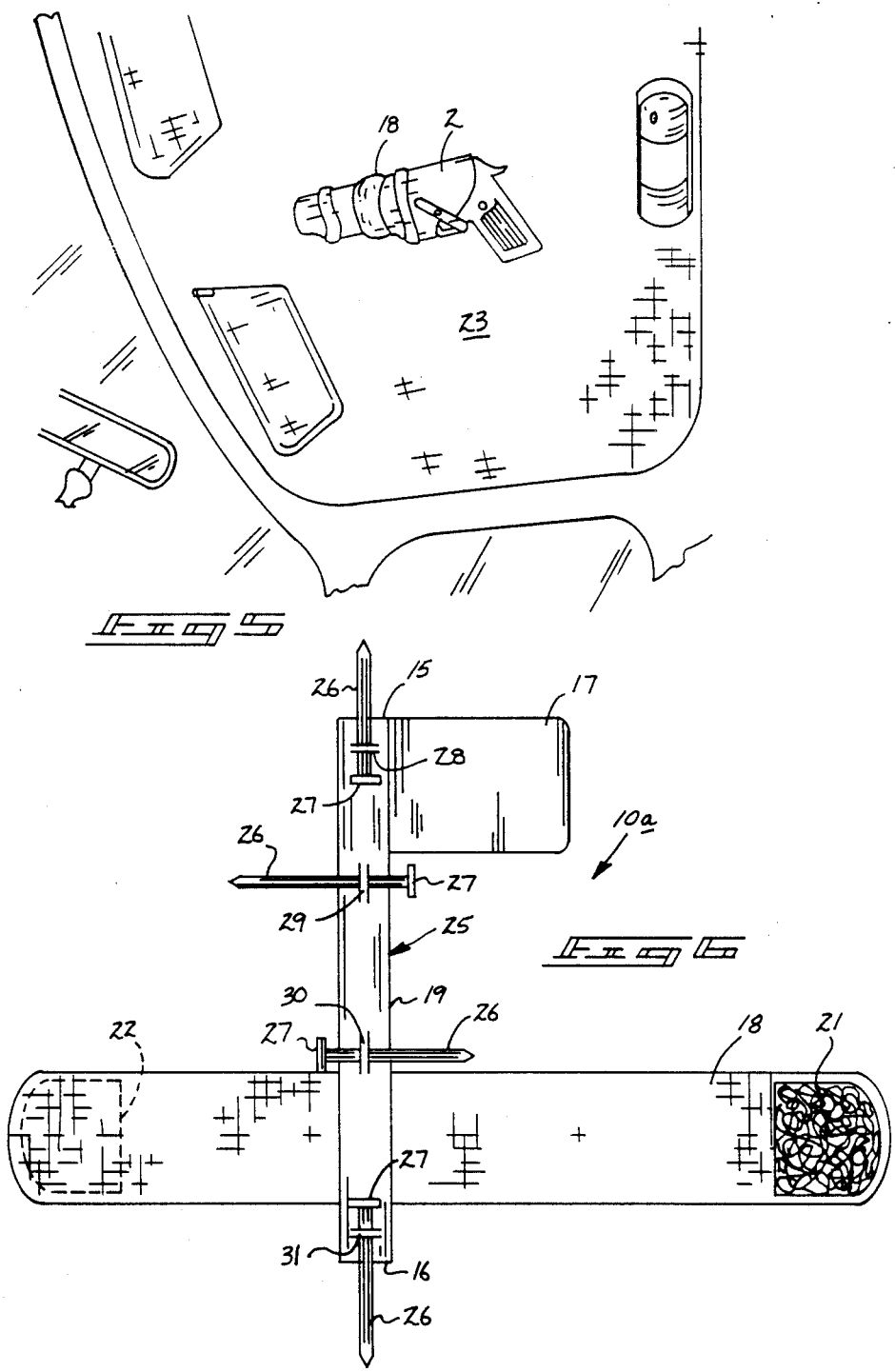

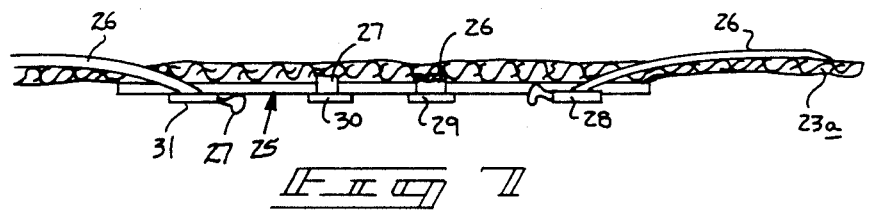
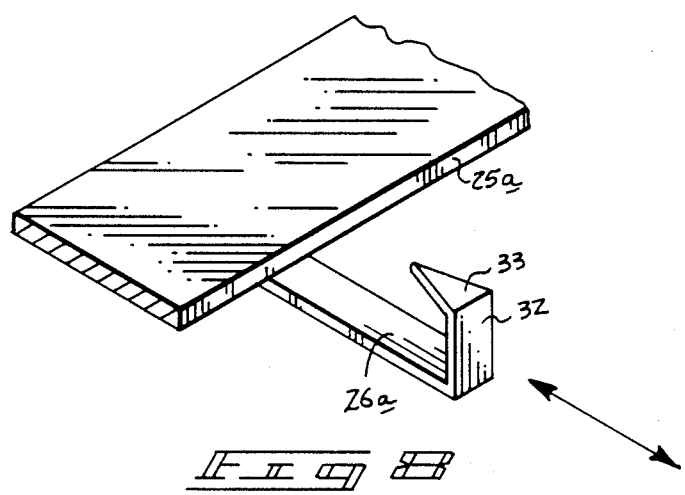
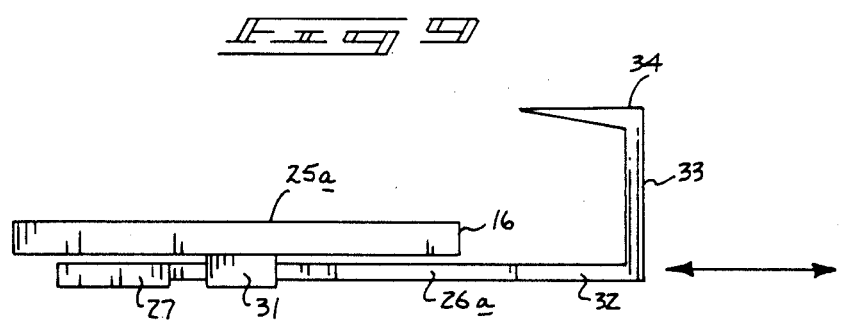

4,984,725

VEHICULAR HOLSTER MOUNT APPARATUS

BACKGROUND OF THE INVENTION

1. Field of the Invention

The field of invention relates to holster securement apparatus, and more particularly pertains to a new and improved vehicular holster mount apparatus wherein the same selectively mounts a support apparatus adjacent an interior portion of a vehicular roof to secure a holster thereto.

2. Description of the Prior Art

The use of various organizations to secure a firearm's holster to interior portions of vehicles has been developed in the prior art. Heretofore, however, the holsters are frequently positioned to such accessory items as steering wheel columns, visors, and the like. The need to develop an organization to flush-mount a holster adjacent an interior surface of a vehicular roof to provide convenient access thereto, as well as essentially removing the holster from inadvertent usage and removal from the working environment of a vehicular interior is provided. Examples of the prior art include U.S. Pat. No. 4,256,245 to Serres wherein a bracket is mounted to a sun visor of a vehicle, with a pistol holster selectively mounted to the bracket. The organization of the Serres patent is removed from that of the instant application that provides an organization to mount the holster not to a sun visor that provides obstructed vision through a vehicle windshield, but further limits use the sun visor within the vehicle.

U.S. Pat. No. 4,029,242 to Stoesser illustrates the use of a leg holster wherein a circumferential upper and lower band is mounted to an individual's leg mounting a holster therebetween.

U.S. Pat. No. 4,057,181 to Finnigan illustrates a container for articles such as cards, a pistol, and the like, mounted to a shoulder strap arrangement for a harness within a vehicle.

U.S. Pat. No. 1,322,198 to Morrison sets forth the use of a holster of a generally "U" shaped configuration, including a flange directed outwardly therefrom to permit securement of the holster to various objects.

U.S. Pat. No. 4,762,255 to Dunn illustrates a container mounted to a web for securement to a bicycle for transport of various articles by the bicycle.

As such, it may be appreciated that there continues to be a need for a new and improved vehicular holster mount apparatus wherein the same addresses both the problems of ease of use and effectiveness in construction and in this respect, the present invention substantially fulfills this need.

SUMMARY OF THE INVENTION

In view of the foregoing disadvantages inherent in the known types of holster mounts now present in the prior art, the present invention provides a vehicular holster mount apparatus wherein the same enables convenient securement of a holster to an interior roof portion of a vehicle. As such, the general purpose of the present invention, which will be described subsequently in greater detail, is to provide a new and improved vehicular holster mount apparatus which has all the advantages of the prior art holster mounts and none of the disadvantages.

To attain this, the present invention provides an apparatus including an elongate, rigid spine member mounting a plate member orthogonally relative to an upper end of the spine, with a flexible belt including a fastener member mounted adjacent a lower end of the spine, wherein the spine is mounted to a roof portion of a vehicle. The apparatus further includes pin members projecting orthogonally and longitudinally of the spine to be directed within the headliner of a vehicular roof to mount the spine thereto. A holster belt loop is directed about the plate, with the flexible strap securing the holster relative to the spine to position the holster in a secured orientation relative to the interior portion of the vehicular roof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehiclar holster mount apparatus which has all the advantages of the prior art holster mount apparatus and none of the disadvantages.

It is another object of the present invention to provide a new and improved vehicular holster mount apparatus which may be easily and efficiently manufactured and marketed.

It is a further object of the present invention to provide a new and improved vehicular holster mount apparatus which is of a durable and reliable construction.

An even further object of the present invention is to provide a new and improved vehicular holster mount apparatus which is susceptible of a low cost of manufacture with regard to both materials and labor, and which accordingly is then susceptible of low prices of sale to the consuming public, thereby making such vehicular holster mount apparatus economically available to the buying public.

Still yet another object of the present invention is to provide a new and improved vehicular holster mount apparatus which provides in the apparatuses and methods of the prior art some of the advantages thereof, while simultaneously overcoming some of the disadvantages normally associated therewith.

Still another object of the present invention is to provide a new and improved vehicular holster mount apparatus that is readily and conveniently securable to an interior surface of an automotive roof or headliner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view taken in elevation of a prior art vehicular holster mount apparatus.

FIG. 2 is an orthographic top view of the instant invention.

FIG. 5 is an isometric illustration of a holster and pistol mounted to an interior surface of a vehicle roof utilizing the instant invention.

FIG. 6 is an orthographic view of a modification of the instant invention.

FIG. 7 is an orthographic side view of the pins utilized in FIG. 6.

FIG. 8 is an isometric illustration of a modified pin utilized by the instant invention.

FIG. 9 is an orthographic side view taken in elevation of the modified pin of FIG. 8.

DESCRIPTION OF THE PREFERRED EMBODIMENT

Figure 3:
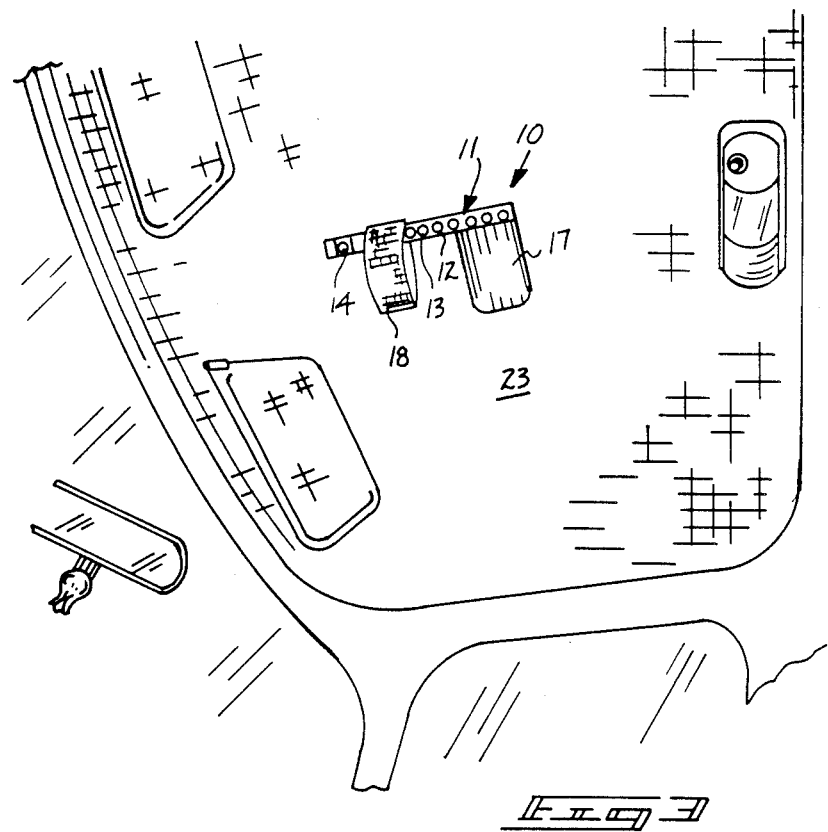
FIG. 3 is an isometric illustration of the instant invention secured to an interior surface of a vehicular roof.
Figure 4:
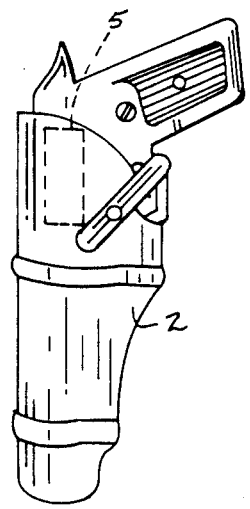
FIG. 4 is an orthographic view taken in elevation of a conventional holster and pistol for securement to the instant invention.

With reference now to the drawings, and in particular to FIGS. 1 to 9 thereof, a new and improved vehicular holster mount apparatus embodying the principles and concepts of the present invention and generally designated by the reference numerals 10 and 10a will be described.

FIG. 1 illustrates a prior art holster mount organization 1 mounted to a sun visor 3 of a conventional vehicle. A holster 2 in this organization is mounted to a bracket 4 that in turn is fixedly mounted to the sun visor.

More specifically, the vehicular holster mount apparatus 10 of the instant invention essentially comprises a rigid, elongate strip 11 defining a spine that includes a first fastener 12, a second fastener 13, and a third fastener 14 spaced at intervals along the spine 11 and directed orthogonally therethrough to mount the spine to a vehicular roof 23, as illustrated in FIG. 3 for example. The spine includes a first end 15 spaced from a remote terminal end 16 and defined by an elongate right side spaced from an elongate left side. A semi-rigid plate member 17 utilizing a plurality of plate fasteners 17a is spaced coextensively with the first end 15 and extending orthogonally relative to the spine and directed outwardly from the elongate right side 19, as illustrated in FIG. 2. The plate member 17 is mounted to the spine along the first end 15, as noted, spaced above the first fastener 12. Mounted between the second and third fasteners 13 and 14 respectively is a flexible strap member 18 that includes a first and second respective hook and loop fastener patch 21 and 22 (see FIG. 6 for example), wherein the opposed first and second hook and loop fastener patches 21 and 22 are mounted adjacent opposed terminal ends of the strap 18 on opposite sides thereof to enable the strap 18 to be secured in a loop, as illustrated in FIGS. 3 and 5 for example, to surround a holster and secure the holster adjacent the spine 11. The holster belt loop 5 mounted to the holster in a conventional manner on a rear surface thereof is directed over the plate member 17 that in turn secures the upper end of the holster 2 against the spine, while the flexible strap 18 secures the holster bottom portion against the spine.

Reference to FIG. 6 illustrates a modified vehicular holster mount apparatus 10a that in lieu of fasteners, such as the fasteners 12, 13, and 14, provide a series of arcuate pins 26 mounted to a modified spine 25. The pins define an assembly including four pins, wherein a first pin extends orthogonally relative to the first end 15 of the spine 25, wherein the first pin is directed through a first sleeve 28 that is oriented parallel to the first end 15, with a second and third pin respectively mounted through a second and third sleeve 29 and 30 that are each aligned parallel to the right and left sides of the modified spine 25, and finally a fourth pin is slidably mounted through a fourth sleeve 31 that is aligned parallel to and spaced adjacent the second end 16 of the spine. Each of the pins include an enlarged head 27, wherein each of the pins includes a pointed remote terminal end spaced from the enlarged head 27, wherein the pointed ends are spaced above the spine 25 to be directed within the headliner 23a of the vehicular roof 23. The pins thus project into the headliner and avoid damage to the roof structure of the associated vehicle. FIG. 8 illustrates a modified pin 26a that instead of an arcuate pin, includes first elongate horizontal leg 32 including the enlarged heads 27 mounted thereon mounted within a sleeve, such as the fourth sleeve 31 positioned adjacent the second end 16 of the spine 25a. The first elongate horizontal leg 32 terminates in a vertical second leg 33 integrally and orthogonally mounted to the first leg and extending upwardly beyond the spine 25a, with a pointed horizontal third leg spaced parallel to and above the first horizontal leg, wherein the third leg 34 is of a length less than that of the first leg 32 to be directed interiorly of the headliner 23a of an associated automotive vehicle.

It is understand that four such modified pins 26a are utilized in lieu of the pins 26, as illustrated in FIG. 6.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular holster mount apparatus for securement of a holster to an interior roof surface of a vehicle, wherein the holster includes an elongate pocket to receive a pistol, with a loop mounted to a rear surface of the pocket, the apparatus comprising, an elongate, rigid spine member including a first end and a second end, with spaced right and left sides, the spine member further including a series of fastener means for securement of the spine to the interior roof surface, and a plate member orthogonally and coextensively mounted to the first end of the spine to receive the loop therearound, and a flexible strap member secured to the spine adjacent the second end of the spine for securement about a lower portion of the holster.

2. An apparatus as set forth in claim 1 wherein the plate member is defined as a semi-rigid plate extending outwardly and orthogonally relative to the right side of the spine, wherein an upper surface of the plate is coextensive with the first end of the spine.

3. An apparatus as set forth in claim 2 wherein the flexible strap is mounted adjacent to and spaced relative to the second end of the spine, and wherein the flexible strap includes a strap first end and a strap second end, with a respective first and second hook and loop fastener patch mounted adjacent the respective first and second ends of the strap on opposed side surfaces of the strap to enable the strap to envelope the holster and manually attach the first hook and loop fastener patch to the second hook and loop fastener patch.

4. An apparatus as set forth in claim 3 wherein the fastener means include a first fastener directed through the spine spaced below the plate member, and a second and third fastener directed through the spine spaced respectively above and below the strap member to enhance rigidity of the spine in securing the holster to the spine by the strap member.

5. An apparatus as set forth in claim 3 wherein each fastener means includes a slidable pin, each slidable pin including a sleeve slidably securing the pin to the spine, and each pin includes an enlarged head to enhance manual grasping of the head for sliding engagement of the pin relative to the spine.

6. An apparatus as set forth in claim 5 wherein each pin includes a first elongate leg slidably mounted parallel relative to an outer surface of the spine, wherein the first leg extends beyond the spine, and each pin further includes a vertical second leg extending beyond a bottom surface of the spine, and the pin further includes a horizontal third leg extending above the first leg, wherein the third leg terminates in a pointed end to engage a headliner portion of the roof surface.

7. An apparatus as set forth in claim 6 wherein the spine includes four pins slidably mounted within four sleeves, and defined by a first pin whose first elongate horizontal leg extends orthogonally relative to the first end of the spine, and a second pin whose first horizontal leg extends orthogonally relative to the second end of the spine, and a third and fourth pin, wherein the third and fourth pin are positioned between the plate member and the flexible strap, wherein the third and fourth pin each include a horizontal leg extending orthogonally relative to the respective right and left side of the spine.

* * * * *